(12) United States Patent
Shi et al.

(10) Patent No.: US 8,167,546 B2
(45) Date of Patent: May 1, 2012

(54) CERAMIC TURBINE SHROUD SUPPORT

(75) Inventors: Jun Shi, Glastonbury, CT (US); Kevin E. Green, Broad Brook, CT (US); Gregory E. Reinhardt, South Glastonbury, CT (US)

(73) Assignee: United Technologies Corporation, Hartford, CT (US)

(*) Notice: Subject to any disclaimer, the term of this patent is extended or adjusted under 35 U.S.C. 154(b) by 480 days.

(21) Appl. No.: 12/552,157

(22) Filed: Sep. 1, 2009

(65) Prior Publication Data
US 2011/0052384 A1 Mar. 3, 2011

(51) Int. Cl.
F01D 5/20 (2006.01)
(52) U.S. Cl. .................. 415/173.1; 415/213.1
(58) Field of Classification Search ......... 415/173.1, 415/209.2, 213.1
See application file for complete search history.

(56) References Cited

U.S. PATENT DOCUMENTS

| | | |
|---|---|---|
| 3,295,824 A | 1/1967 | Woodwell et al. |
| 3,825,364 A | 7/1974 | Halila et al. |
| 3,901,622 A | 8/1975 | Ricketts |
| 4,008,978 A | 2/1977 | Smale |
| 4,087,199 A | 5/1978 | Hemsworth et al. |
| 4,398,866 A | 8/1983 | Hartel et al. |
| 4,411,594 A | 10/1983 | Pellow et al. |
| 4,439,981 A | 4/1984 | Weiler et al. |
| 4,502,809 A | 3/1985 | Geary |
| 4,522,557 A | 6/1985 | Bouiller et al. |
| 4,639,194 A | 1/1987 | Bell, III et al. |
| 4,643,638 A | 2/1987 | Laurello |
| 4,650,395 A | 3/1987 | Weidner |
| 4,669,954 A | 6/1987 | Habarou et al. |
| 4,676,715 A * | 6/1987 | Imbault et al. ............ 415/116 |
| 4,679,981 A | 7/1987 | Guibert et al. |
| 4,684,320 A | 8/1987 | Kinz |
| 4,759,687 A | 7/1988 | Miraucourt et al. |
| 5,080,557 A | 1/1992 | Berger |
| 5,167,487 A | 12/1992 | Rock |
| 5,169,287 A | 12/1992 | Proctor et al. |

(Continued)

FOREIGN PATENT DOCUMENTS
EP 0492865 A1 7/1992
(Continued)

OTHER PUBLICATIONS

Jimenez, O., Mclain, J., Edwards, B., Parthasasathy, V., Bagheri, H. and Bolander, G., "Ceramic Stationary Gas Turbine Development Program-design and Test of a Ceramic Turbine Blade," ASME 98-GT-529, International Gas Turbine and Aeroengine Congress and Exhibition, Stockholm, Sweden, 1998, (pp. 1-9).

(Continued)

*Primary Examiner* — Edward Look
*Assistant Examiner* — Adam W Brown
(74) *Attorney, Agent, or Firm* — Kinney & Lange, P.A.

(57) ABSTRACT

A turbine shroud includes a ceramic shroud ring configured to surround a plurality of turbine rotor blades, a plurality of slots circumferentially distributed around the ceramic shroud ring, a forward metallic support ring, a plurality of tabs attached to a forward edge of the forward metallic support ring configured to engage a turbine support case, and a plurality of tabs attached to an aft edge of the forward metallic support ring received by the slots of the ceramic shroud ring. Only two axially extending radial surfaces of each of the tabs attached to the aft edge of the forward metallic support ring are configured to contact the slots of the ceramic shroud ring.

25 Claims, 4 Drawing Sheets

U.S. PATENT DOCUMENTS

| | | | |
|---|---|---|---|
| 5,181,826 A | 1/1993 | Rock | |
| 5,279,031 A | 1/1994 | Carruthers et al. | |
| 5,333,992 A | 8/1994 | Kane et al. | |
| 5,368,095 A | 11/1994 | Kadambi et al. | |
| 5,439,348 A | 8/1995 | Hughes et al. | |
| 5,486,090 A | 1/1996 | Thompson et al. | |
| 5,562,408 A | 10/1996 | Proctor et al. | |
| 5,609,469 A | 3/1997 | Worley et al. | |
| 6,048,170 A | 4/2000 | Dodd | |
| 6,139,257 A | 10/2000 | Proctor et al. | |
| 6,142,731 A * | 11/2000 | Dewis et al. | 415/136 |
| 6,250,883 B1 | 6/2001 | Robinson et al. | |
| 6,340,285 B1 | 1/2002 | Gonyou et al. | |
| 6,354,795 B1 | 3/2002 | White et al. | |
| 6,368,054 B1 | 4/2002 | Lucas | |
| 6,733,233 B2 | 5/2004 | Jasklowski | |
| 6,758,653 B2 | 7/2004 | Morrison | |
| 6,910,853 B2 | 6/2005 | Corman et al. | |
| 6,932,566 B2 | 8/2005 | Suzumura et al. | |
| 6,942,445 B2 | 9/2005 | Morris et al. | |
| 6,997,673 B2 | 2/2006 | Morris et al. | |
| 7,008,183 B2 | 3/2006 | Sayegh et al. | |
| 7,033,138 B2 | 4/2006 | Tomita et al. | |
| 7,117,983 B2 | 10/2006 | Good et al. | |
| 7,290,982 B2 | 11/2007 | Girard et al. | |
| 7,771,160 B2 | 8/2010 | Shi et al. | |
| 2001/0021343 A1 | 9/2001 | Kuwabara et al. | |
| 2005/0232752 A1 | 10/2005 | Meisels | |
| 2008/0010990 A1 | 1/2008 | Shi et al. | |
| 2009/0272122 A1 | 11/2009 | Shi et al. | |
| 2010/0104433 A1 | 4/2010 | Shi et al. | |

FOREIGN PATENT DOCUMENTS

| | | |
|---|---|---|
| EP | 1890010 A2 | 2/2008 |
| JP | 63-11242 A | 1/1988 |
| JP | 63-40776 A | 2/1988 |
| JP | 2211960 A | 8/1990 |
| JP | 4119225 A | 4/1992 |
| JP | 9228804 A2 | 9/1997 |
| JP | 2004176911 A | 6/2004 |

OTHER PUBLICATIONS

Norton, Frey, G. A., Bagheri, H., Flerstein, A., Twardochieb, C., Jimenez, O., and Saith, A., "Ceramic Stationary Gas Turbine Development Program-Design and Life Assessment of Ceramic Components," ASME Paper 95-GT-383, International Gas Turbine and Aeroengine Congress and Exhibition, Houston, Texas, 1995, (pp. 1-9).

Sinnet, G.T., French, J.M. and Groseciose, L.E., "Progress on the Hybrid Vehicle Turbine Engine Technology Support (HVTE-TS) Program," ASME Paper 97-GT-88, International Gas Turbine and Aeroengine Congress and Exhibition, Orlando, Florida, 1997, (pp. 1-13).

* cited by examiner

CERAMIC TURBINE SHROUD SUPPORT

STATEMENT OF GOVERNMENT INTEREST

This invention was made with Government support under DE-FC02-00CH11060 awarded by the United States Army. The Government has certain rights in this invention.

BACKGROUND

The present invention relates to turbine engines. In particular, the present invention relates to devices for attaching ceramic turbine shrouds to surrounding metallic turbine components.

A gas turbine engine commonly includes a fan, a compressor, a combustor, a turbine, and an exhaust nozzle. During engine operation, working medium gases, for example air, are drawn into and compressed in the compressor. The compressed air is channeled to the combustor where fuel is added to the air and the air/fuel mixture is ignited. The products of combustion are discharged to the turbine section, which extracts work from these products to produce useful thrust to power, for example, an aircraft in flight. A portion of the work extracted from the products of combustion by the turbine is used to power the compressor.

The compressor and turbine commonly include alternating stages of rotor blades and stator vanes. Compressor and turbine rotors include stationary annular fluid seals surrounding the blades and acting to contain and direct the flow of working medium fluid through successive stages. The annular compressor and turbine rotor seals, sometimes referred to as turbine shrouds and outer air seals, may be attached to the engine by, for example, a support case.

The operating temperatures of some engine stages, such as in the high pressure turbine stages, may exceed the material limits of the metallic turbine shroud and therefore necessitate cooling the shroud by using, for example, compressor bleed air directed to the segment through the support rings. Ceramic materials have been studied for application to components in the hot section of gas turbine engines to replace metallic materials that require such cooling in order to withstand the high temperature of combustion gas. For example, ceramics have been employed in the fabrication of hybrid turbine rotors and integrally bladed rotors (IBRs), which are sometimes referred to as bladed disks or simply blisks. In both cases, particularly that of a ceramic IBR, a large gap between rotor blade tip and metal shrouds commonly results from the low thermal expansion of ceramics that make up the blades and the IBRs. The low density and high stiffness of ceramics reduce the radial displacement of the blade tip and therefore exacerbates the issue further. The large gap or clearance at the blade tip results in a high percentage of hot working medium gas flow leaking through the tip-shroud gap that reduces the transfer of energy from the gas flow to turbine blades, which in turn causes an engine performance penalty as useful energy is not harnessed. The performance penalty is more severe for small gas turbine engines because the engine size makes a small tip clearance large relative to the gas flow path.

To minimize losses induced by large tip clearance, ceramic shrouds have been employed to control the gap between rotor blade tip and the inner surface of the shroud. Due to its high stiffness, low thermal expansion and high thermal conductivity, a ceramic shroud experiences less thermal distortion than a metal shroud for a given set of thermal loading conditions. The high temperature capability of the ceramics also leads to reduced cooling air requirement, which provides an additional benefit to engine performance by reducing the amount of energy that must be diverted from propulsion to cooling.

The main difficulty in ceramic shroud design is the attachment to the metallic engine structure because of low ductility and low thermal expansion of ceramics relative to metals. Elastic springs have been used to support ceramic shrouds, but their performance at elevated temperatures over long durations is questionable due to metal creep. Another common technique of supporting a ceramic shroud is through a tab and slot approach in which tabs on the ceramic shroud engage slots on a metallic casing. Generally there are a number of tab and slot pairs evenly distributed circumferentially to spread the support load and to position the shroud radially. This method is directed at minimizing thermal constraints by allowing the ceramic shroud and metal support to grow independent of each other. However, in practice, due to manufacturing tolerance control, uneven thermal fields, and thermal deformation of the shroud and the casing, thermal stress at the tabs may be sufficiently high to cause local damage. Finally, shrink-fitting a metallic support to the ceramic shroud provides the advantage of introducing compressive stress into the ceramic shroud and improves shroud reliability. However, it is difficult to control the clamp load from the shrink-fit metallic support on the shroud over a wide range of thermal transient conditions.

SUMMARY

Embodiments of the present invention include a turbine shroud includes a ceramic shroud ring configured to surround a plurality of turbine rotor blades, a plurality of slots circumferentially distributed around the ceramic shroud ring, a forward metallic support ring, a plurality of tabs attached to a forward edge of the forward metallic support ring configured to engage a turbine support case, and a plurality of tabs attached to an aft edge of the forward metallic support ring received by the slots of the ceramic shroud ring. Only two axially extending radial surfaces of each of the tabs attached to the aft edge of the forward metallic support ring are configured to contact the slots of the ceramic shroud ring.

Embodiments of the present invention also include a turbine shroud including a ceramic shroud ring configured to surround a plurality of turbine rotor blades and including a plurality of circumferentially distributed slots, a forward metallic support ring including a plurality of forward tabs configured to engage an turbine support case and a plurality of aft tabs received by the slots of the ceramic shroud ring, an aft metallic support ring configured to engage a stator assembly aft of the turbine shroud, and a resilient member interposed between the ceramic shroud ring and the aft metallic support ring such that the resilient member biases the ceramic shroud ring axially.

DETAILED DESCRIPTION

Figure 1:
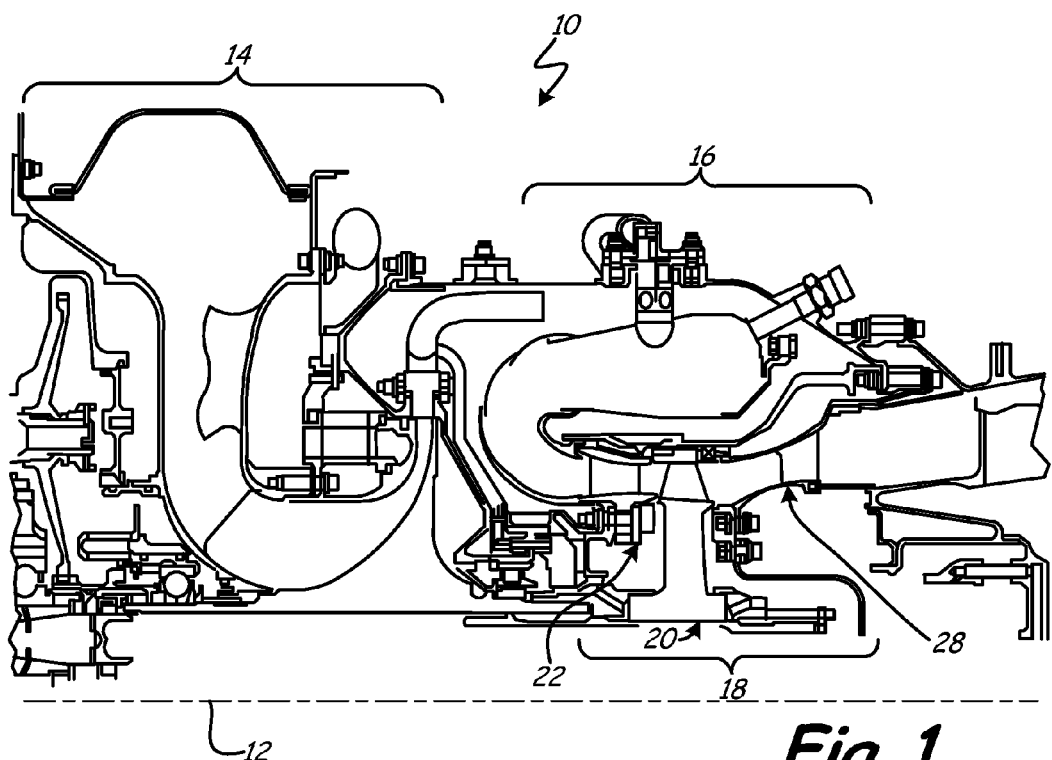
FIG. 1 is an axial cross-section of gas turbine engine including a turbine shroud assembly according to the present invention.

FIG. 1 is an axial cross-section of gas turbine engine 10 including engine axis 12, compressor 14, combustor 16, and turbine 18. A working medium fluid, such as air, is pulled into the front of engine 10 by, for example, a fan (not shown) and directed into compressor 14. The air stream is successively compressed through stages of compressor 14 and directed into combustor 16. In combustor 16, the air stream is mixed with fuel and ignited. The air and fuel mixture ignited in combustor section 16 is directed into turbine 18 in which the mixture is successively expanded through alternating stages of turbine rotors, such as rotor 20 and stators, such as stator 22. A portion of the gas and fuel mixture leaving combustor 16 acts to rotate turbine 18, which powers compressor 14. The remaining portion of the gas and fuel mixture passing through turbine 18 exits the back of engine 10 to provide thrust for engine 10.

Figure 2:
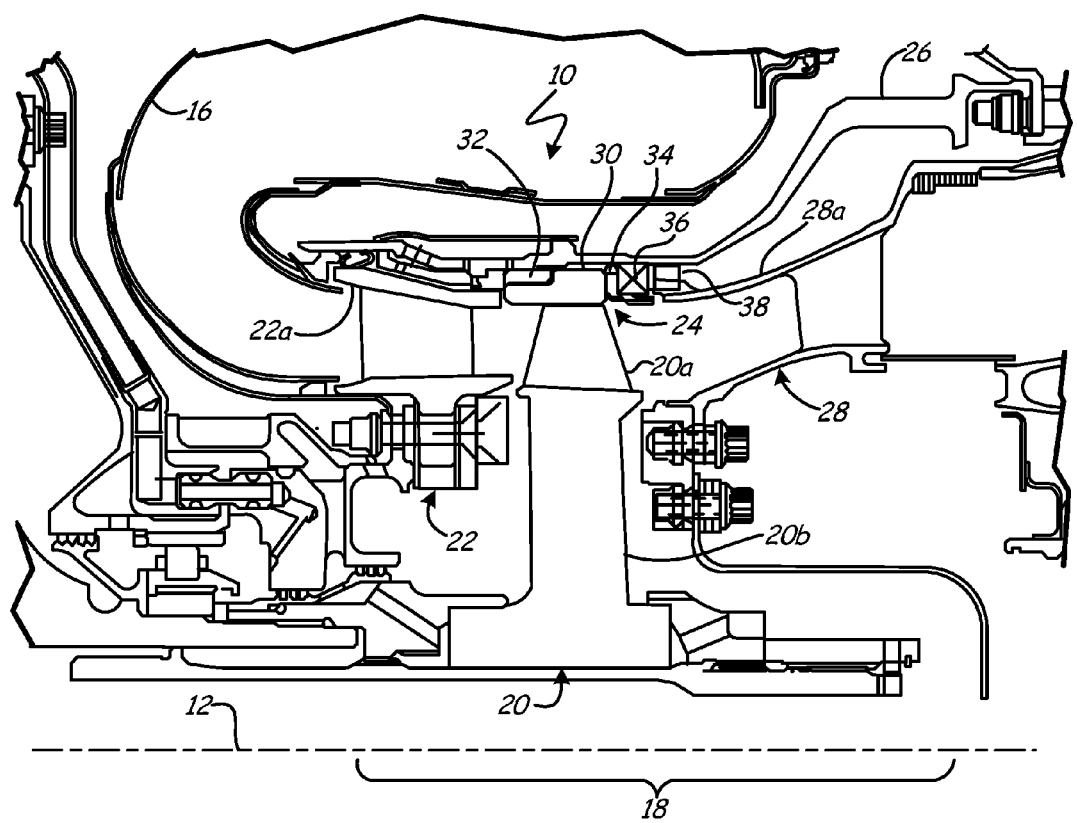
FIG. 2 is a detail section view of the gas turbine engine of FIG. 1.

FIG. 2 is a detail section view of gas turbine engine 10 including rotor 20, stator 22, shroud assembly 24, support case 26, and stator 28. Stator 22 can adjoin an endwall 22a. Turbine rotor 20 may be, for example, a ceramic integrated bladed rotor (IBR) including a circumferential array of blades 20a integral with and configured to rotate with rotor disc 20b about engine axis 12. Immediately upstream and downstream of rotor 20 are stators 22 and 28, which may be, for example, stationary turbine nozzles including circumferential arrays of vanes configured to guide working medium fluid flow through successive turbine stages, such as through turbine rotor 20. Circumscribing the tips of blades 20a is shroud assembly 24. Shroud assembly 24 includes ceramic shroud ring 30, forward metallic support ring 32, metallic spring backing ring 34, wave spring 36, and aft metallic support ring 38. Ceramic shroud 30 is supported by forward support ring 32 and aligned to support case 26. Forward support ring 32 is connected to turbine support case 26. Aft support ring 38 is connected to outer shroud 28a of stator 28. Interposed between ceramic shroud 30 and aft support ring 38 is backing ring 34 and wave spring 36. Backing ring 34 acts to contain wave spring 36 radially, while aft support ring 38 compresses and contains wave spring 36 axially. Aft support ring 38 and wave spring 36 thereby axially bias ceramic shroud 30 by generating a preload on the aft side of ceramic shroud 30.

During engine operation, ceramic shroud ring 30 of shroud assembly 24 acts to contain and direct the flow of working medium gas through turbine rotor stage 20. Gas flow leaking through the gap between the tips of blades 20a and ceramic shroud 30 reduces the transfer of energy from the gas flow to turbine blades 20a, which in turn causes a performance penalty on engine 10 as useful energy from the gas flow is lost. Unlike a metallic turbine shroud, ceramic shroud ring 30 acts to maintain a relatively small gap between blades 20a of ceramic IRB rotor 20, because both components experience comparably low thermal expansion at the operating temperatures of engine 10. However, the support structure of engine 10, such as support case 26, and other adjacent components, such as stators 22 and 28, to which ceramic shroud 30 is attached are metallic and therefore experience significantly higher thermal expansion during operation of engine 10 than does ceramic shroud 30. Mismatches in thermal expansion between metallic components and ceramic shroud 30, as well as the low ductility of ceramic shroud 30 may act to concentrate stresses on shroud 30. Embodiments of the present invention therefore provide turbine shroud assemblies adapted to provide adequate surface area contact between the ceramic shroud and metallic supports to structurally support the shroud, while simultaneously maintaining a well defined surface area contact to prevent localized stress concentration due to imbalanced thermal expansion between the ceramic shroud and metallic supports. A contact area is defined by crowns 42a and 42b (e.g., arcuate surfaces) on opposite sides of each of the fingers 42 (see FIGS. 3A and 3C). Embodiments of the present invention also employ resilient members adapted to compensate for imbalanced radial and axial thermal expansion between the ceramic shroud and metallic support components.

Figure 3A:
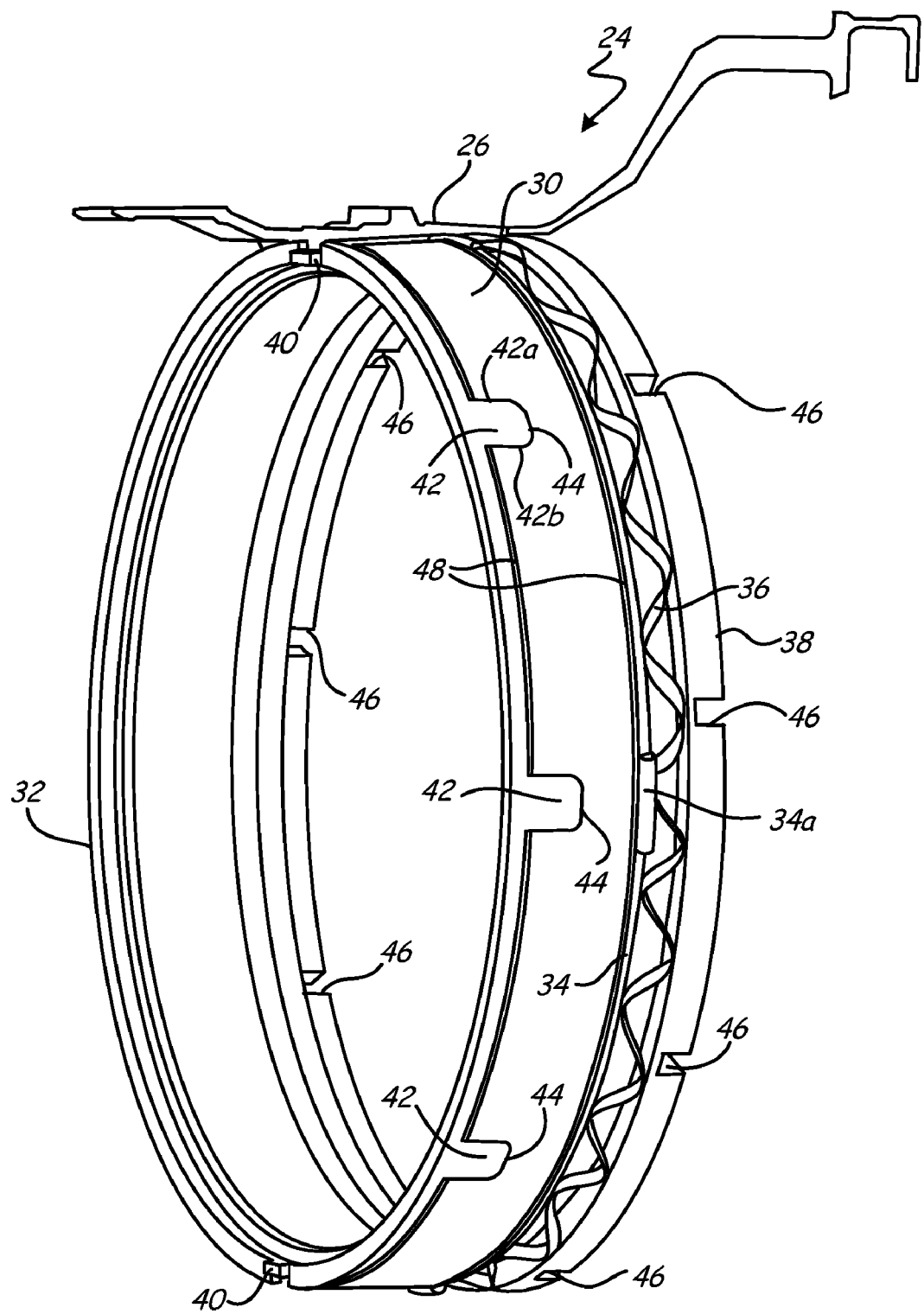
FIG. 3A is a perspective view of the shroud assembly of FIGS. 1 and 2.
Figure 3B:
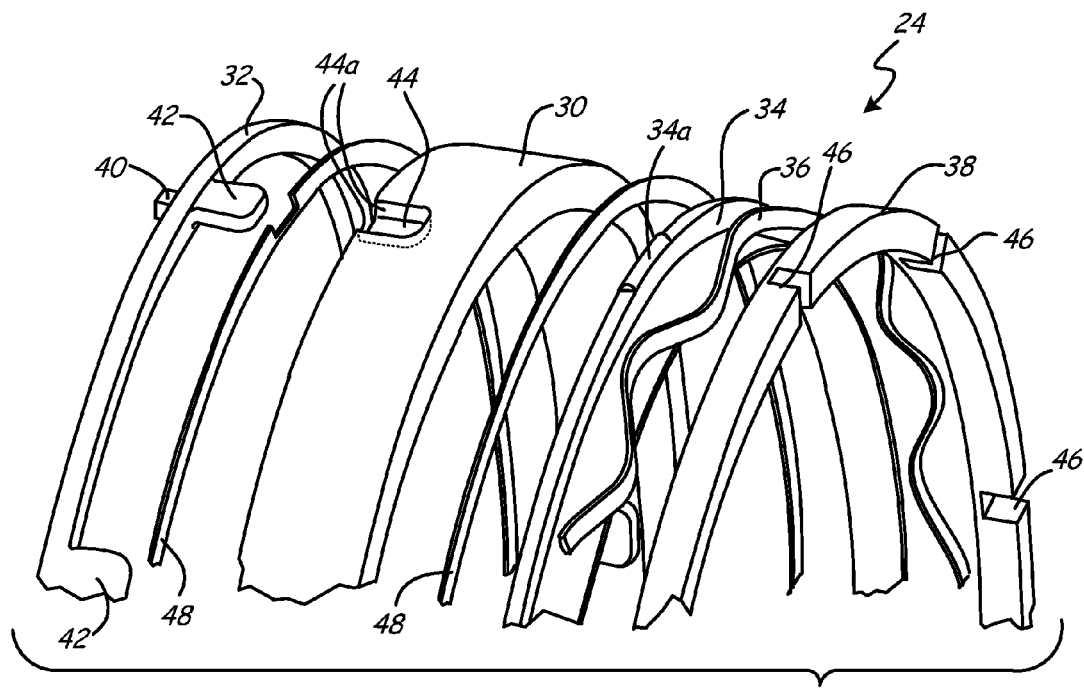
FIG. 3B is a partial exploded view of the shroud assembly of FIGS. 1-3A.
Figure 3C:
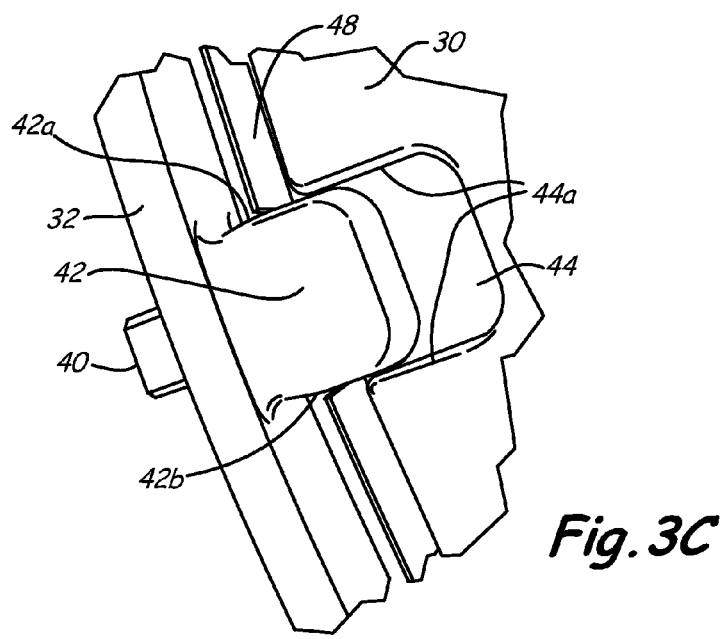
FIG. 3C is a detail exploded view of a metallic-ceramic interface of the shroud assembly of FIGS. 1-3B.

FIGS. 3A-3C are detail views of turbine shroud assembly 24 including ceramic shroud ring 30, forward metallic support ring 32, metallic spring backing ring 34, wave spring 36, and aft metallic support ring 38. FIG. 3A is a perspective view of shroud assembly 24. FIG. 3B is a partial exploded view of shroud assembly 24. FIG. 3C is a detail exploded view of forward support ring 32 and ceramic shroud 30 of shroud assembly 24. In FIG. 3A, forward support ring 32 includes two forward tabs 40 and eight aft tabs 42. Ceramic shroud 30 includes eight circumferentially distributed slots 44 extending axially from the forward side toward the center of shroud 30. Slots 44 in ceramic shroud 30 are configured to receive aft tabs 42 on forward metallic support ring 32. Forward tabs 40 on support ring 32 are configured to engage support case 26. Aft support ring 38 includes eight aft slots 46 configured to receive tabs on outer shroud 28a of stator 28 (shown in FIGS. 1 and 2). Interposed between ceramic shroud 30 and aft support ring 38 is backing ring 34 and wave spring 36. Backing ring 34 acts to contain wave spring 36 radially, while aft support ring 38 compresses and contains wave spring 36 axially.

The eight aft tabs 42 of forward support ring 32 are configured to act as stiff springs, thereby supporting ceramic shroud 30 circumferentially and radially. To adequately support ceramic shroud 30 and simultaneously reduce stress concentrations caused by imbalanced thermal growth between shroud 30 and support ring 32, tabs 42 on forward support ring 32 are configured to contact slots 44 on ceramic shroud 30 only on two surfaces 44a of slots 44 as shown in FIGS. 3B and 3C. Engaging slots 44 on surfaces 44a with tabs 42 provides sufficient surface area to maintain contact between shroud 30 and support ring 32 in the event support ring 32 expands axially and/or radially at a greater rate than shroud 30. Additionally, localized stress concentrations caused by mismatches in thermal expansion between shroud 30 and support ring 32 are reduced by engaging slots 44 only on surfaces 44a, i.e. by the well defined surface areas of crowns 42a and 42b for contact between ceramic shroud 30 and metallic support ring 32. To further reduce stress concentration, soft metal, such as Pt, foils can be inserted between the sides of aft tabs 42 and surfaces 44a of slots 44 on ceramic shroud 30. In addition to providing support, aft tabs 42 on forward support ring 32 are configured to bend to compensate for any machining and/or assembly out-of-tolerances, without overstressing ceramic shroud 30. As discussed above, aft support ring 38 and wave spring 36 axially bias ceramic shroud 30 by generating a preload on the aft side of ceramic shroud 30. In different embodiments of the present invention, the number of aft tabs 42 on forward support ring 32 may vary between three and eight. Higher numbers of tabs may necessitate tighter dimensional tolerance control (but could lead to more uniform loading between the tabs and the ceramic shroud.)

In the axial direction, thermal growth mismatch between ceramic shroud 30 and metallic support rings 32, 38 is compensated for by wave spring 36. Wave spring 36 is interposed between spring backing ring 34 and aft support ring 38, both of which function to spread the load from wave spring 36 over a larger area. Spring backing ring 34 has several, for example four, crowns 34a to position ring 34 at the inner diameter of turbine support case 26, while still allowing cooling air to pass through and cool wave spring 34. The hot gas path surface of spring backing ring 34, i.e. the radially inner circumferential surface, may be coated with a thermal barrier coating (TBC) to reduce the temperature of ring 34 and reduce heat conduction to wave spring 36. Wave spring 36 is preloaded to a desired load level and the load may increase or decrease depending largely on the relative thermal growth of support case 26 and stator 28. The spring rate and size of wave spring 26 may be chosen such that a positive low clamping load is substantially maintained throughout all operating conditions of engine 10.

In some embodiments of the present invention, soft rings, such as gaskets, may be arranged at the ceramic-metal interfaces of shroud assembly 24. In the exploded view of FIG. 3B, for example, gaskets 48 are arranged between forward support ring 32 and the front radial face of ceramic shroud 30, and between the aft radial face of ceramic shroud 30 and spring backing ring 34.

Embodiments of the present invention have several advantages over past ceramic shroud supports. Turbine shrouds according to the present invention, and engines employing such shrouds, are adapted to provide adequate surface area contact between the ceramic shroud and metallic supports to structurally support the shroud, while simultaneously maintaining a well defined surface area contact enough to prevent localized stress concentration due to imbalanced thermal expansion between shroud and supports. Embodiments of the present invention also employ resilient members adapted to compensate for imbalanced radial and axial thermal expansion between the ceramic shroud and metallic support components. Ceramic shrouds and shroud assemblies according to the present invention thereby provide a metallic-ceramic interface capable of supporting a ceramic shroud and acting to reduce stress concentrations on the shroud due to mismatched thermal expansion between ceramic and metallic components.

Although the present invention has been described with reference to preferred embodiments, workers skilled in the art will recognize that changes may be made in form and detail without departing from the spirit and scope of the invention.

The invention claimed is:

1. A turbine shroud comprising:
a ceramic shroud ring configured to surround a plurality of turbine rotor blades;
a plurality of slots circumferentially distributed around the ceramic shroud ring;
a forward metallic support ring;
a plurality of tabs attached to a forward edge of the forward metallic support ring, the tabs configured to engage a turbine support case; and
a plurality of tabs attached to an aft edge of the forward metallic support ring, the tabs received by the slots of the ceramic shroud ring;
wherein only two axially extending radial surfaces of each of the tabs attached to the aft edge of the forward metallic support ring are configured to contact the slots of the ceramic shroud ring.

2. The turbine shroud of claim 1 further comprising:
an aft metallic support ring configured to engage a stator assembly aft of the turbine shroud; and
a resilient member interposed between the ceramic shroud ring and the aft metallic support ring such that the resilient member biases the ceramic shroud ring axially.

3. The turbine shroud of claim 2, wherein the resilient member comprises:
a spring configured to engage an aft radial surface of the ceramic shroud ring; and
a metallic backing ring interposed between the ceramic shroud ring and the aft metallic support ring and configured to axially contain the spring.

4. The turbine shroud of claim 3, wherein the spring comprises a steel wave spring.

5. The turbine shroud of claim 3, wherein the backing ring comprises a plurality of radially extending crowns distributed circumferentially and configured to engage the turbine support case.

6. The turbine shroud of claim 5, wherein the crowns maintain a radial space between the turbine support case and the metallic backing ring through which cooling fluid may flow to cool the spring.

7. The turbine shroud of claim 3, wherein the metallic backing ring comprises a hot gas flow surface with a thermal barrier coating.

8. The turbine shroud of claim 2, wherein the aft metallic support ring comprises a plurality of slots configured to engage tabs in a shroud of a stationary vane array aft of the turbine shroud.

9. The turbine shroud of claim 1 further comprising a soft metallic foil interposed between each of the tabs of the forward metallic support ring and the slots of ceramic shroud ring.

10. The turbine shroud of claim 1, wherein the aft tabs of the forward metallic support ring comprise between three and eight tabs.

11. The turbine shroud of claim 1 further comprising a gasket interposed between an aft radial surface of the forward metallic support ring and a forward radial surface of the ceramic shroud ring.

12. A turbine shroud comprising:
a ceramic shroud ring configured to surround a plurality of turbine rotor blades and including a plurality of circumferentially distributed slots;
a forward metallic support ring including a plurality of forward tabs configured to engage an turbine support case and a plurality of aft tabs received by the slots of the ceramic shroud ring;
an aft metallic support ring configured to engage a stator assembly aft of the turbine shroud; and
a resilient member interposed between the ceramic shroud ring and the aft metallic support ring such that the resilient member biases the ceramic shroud ring axially.

13. The turbine shroud of claim 12, wherein the resilient member comprises:
a spring configured to engage an aft radial surface of the ceramic shroud ring; and
a metallic backing ring interposed between the ceramic shroud ring and the aft metallic support ring and configured to axially contain the spring.

14. The turbine shroud of claim 13, wherein the spring comprises a steel wave spring.

15. The turbine shroud of claim 13, wherein the backing ring comprises a plurality of radially extending crowns distributed circumferentially and configured to engage the turbine support case.

16. The turbine shroud of claim 12, wherein the aft metallic support ring comprises a plurality of slots configured to engage tabs in a shroud of a stationary vane array aft of the turbine shroud.

17. The turbine shroud of claim 12, wherein only two axially extending radial surfaces of each of the aft tabs of the forward metallic support ring are configured to contact the slots of the ceramic shroud ring.

18. The turbine shroud of claim 12 further comprising a soft metallic foil interposed between one or more of the tabs of the forward metallic support ring and one or more of the slots of ceramic shroud ring.

19. The turbine shroud of claim 12, wherein the aft tabs of the forward metallic support ring comprise between three and eight tabs.

20. The turbine shroud of claim 2 further comprising:
a first gasket interposed between an aft radial surface of the forward metallic support ring and a forward radial surface of the ceramic shroud ring; and
a second gasket interposed between an aft radial surface of the ceramic shroud ring and the resilient member.

21. A gas turbine engine comprising:
a support case;
a plurality of rotor blades; and
a turbine shroud assembly circumscribing the rotor blades, the shroud assembly comprising:
a ceramic shroud ring arranged radially outward of the rotor blades and including a plurality of circumferentially distributed slots; and
a forward metallic support ring including a plurality of forward tabs engaging the support case and a plurality of aft tabs received by the slots of the ceramic shroud ring;
wherein only two axially extending radial surfaces of each of the aft tabs of the forward metallic support ring are configured to contact the slots of the ceramic shroud ring.

22. The gas turbine engine of claim 21 further comprising:
a stator assembly aft of the turbine shroud;
an aft metallic support ring configured to engage the stator assembly; and
a resilient member interposed between the ceramic shroud ring and the aft metallic support ring such that the resilient member biases the ceramic shroud ring axially.

23. The gas turbine engine of claim 22, wherein the resilient member comprises:
a spring configured to engage an aft radial surface of the ceramic shroud ring; and
a metallic backing ring interposed between the ceramic shroud ring and the aft metallic support ring and configured to axially contain the spring.

24. The gas turbine engine of claim 23, wherein the spring comprises a steel wave spring.

25. The gas turbine engine of claim 21, wherein the aft metallic support ring comprises a plurality of slots configured to engage tabs in a shroud of a stationary vane array aft of the turbine shroud.

* * * * *